United States Patent [19]

Stern et al.

[11] Patent Number: 4,789,989
[45] Date of Patent: Dec. 6, 1988

[54] SOLAR SIMULATOR EMPLOYING FLEXIBLE-OPTICS

[75] Inventors: Theodore G. Stern; Mickey Cornwall; Donald A. Nirschl, all of San Diego, Calif.

[73] Assignee: General Dynamics Corp./Space Systems Div., San Diego, Calif.

[21] Appl. No.: 101,533

[22] Filed: Sep. 25, 1987

[51] Int. Cl.⁴ ............................................. G02B 6/32
[52] U.S. Cl. .............................. 350/96.18; 350/96.10; 362/32; 372/6
[58] Field of Search .............. 372/6; 350/96.10, 96.18, 350/96.32, 96.33; 362/32

[56] References Cited

U.S. PATENT DOCUMENTS

| | | | |
|---|---|---|---|
| 3,772,506 | 11/1975 | Junginger | 362/32 |
| 4,011,403 | 3/1977 | Epstein et al. | 362/32 |
| 4,389,115 | 6/1983 | Richter | 350/602 |
| 4,460,939 | 7/1984 | Murakami et al. | 362/32 |
| 4,556,284 | 12/1985 | Alhersdoerfer et al. | 362/32 |
| 4,681,396 | 7/1988 | Jones | 372/6 |

Primary Examiner—Leon Scott, Jr.
Attorney, Agent, or Firm—John R. Duncan; Frank D. Gilliam

[57] ABSTRACT

The solar simulator of the invention comprises a source of high intensity light simulating as closely as possible the spectral radiance of the sun directed through a flexible optic light guide into a chamber and pressure sealed through a chamber wall where this light is then directed on to a test specimen in a column or otherwise. The high intensity light is provided by one or more illuminating sources which can be positioned at the distal end or ends of the fiber optics or embedded within a fiber or liquid optic core.

15 Claims, 2 Drawing Sheets

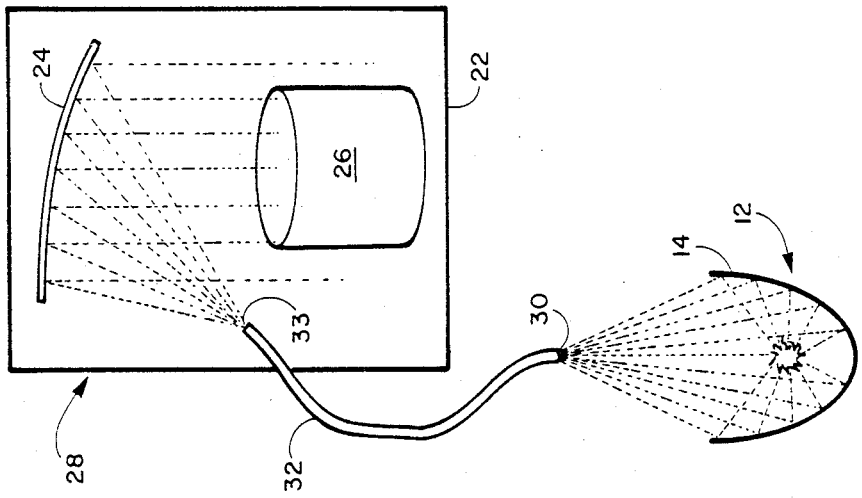
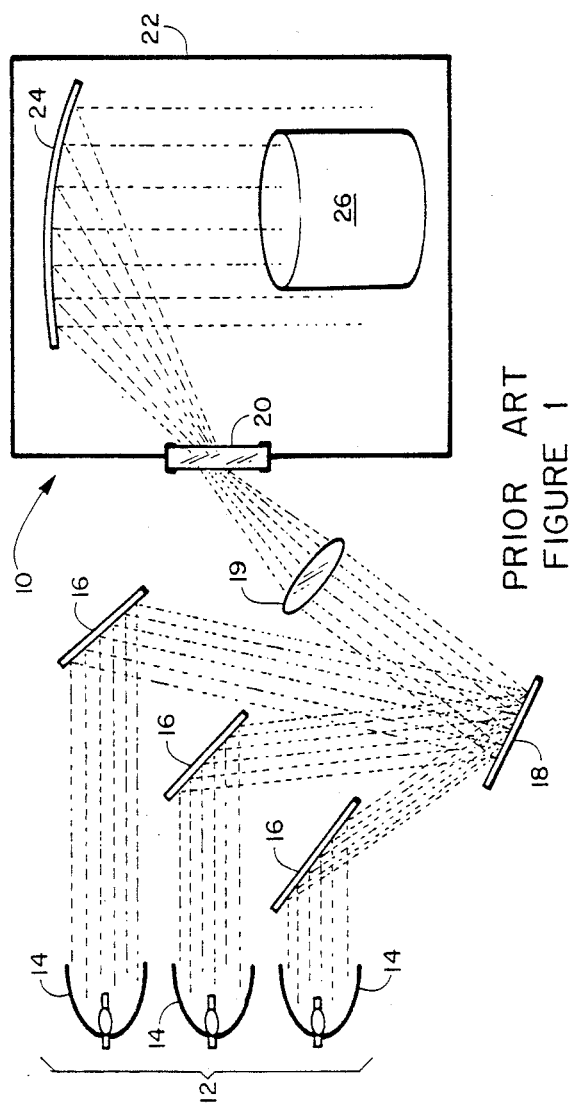
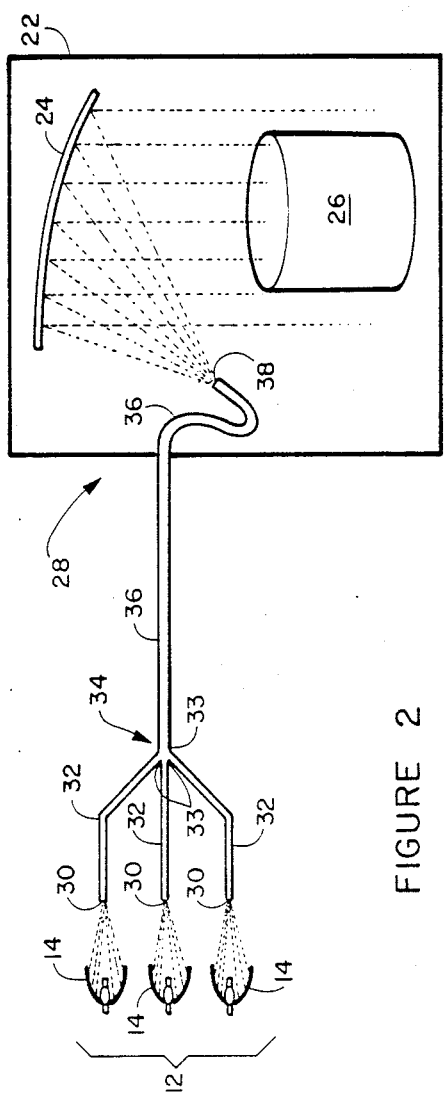
PRIOR ART
FIGURE 1
FIGURE 2
FIGURE 3

SOLAR SIMULATOR EMPLOYING FLEXIBLE-OPTICS

BACKGROUND OF THE INVENTION

The invention is directed to solar simulators and more particularly to a high efficiency solar simulators employing flexible optic technology to transfer simulated sunlight from a high intensity source to an enclosure and illuminating a test specimen with the light from the source either by flood illuminating the test specimen or by first collimating the light and then directing the collimated light on to the specimen.

The total radiation of the sun, as well as its spectrum, have been subjects of much investigation over the centuries. With the advent of space flight and the availability of better instrumentation in the past few years, very accurate measurements of solar characteristics have been recorded. Critical examination of numerous recorded high-altitude measurements of the sun's spectral radiance have been documented. These measurements have been analyzed and as a result of the analysis a spectral standard table has been established. This table is commonly referred to as The Air-Mass Zero Solar Spectrum. This table provides a close simulation of sunlight near the earth but outside of the earth's atmosphere.

The earth's atmosphere creates substantial loss due to absorption and scattering throughout the spectrum. The absorption is particularly strong in the shortwave ultraviolet, due primarily to ozone; and in the longer-wave infrared, due to water vapor and carbon dioxide. The lower the elevation of the sun, and the greater the optical length through the atmosphere, the greater the absorption, especially in the ultraviolet.

A solar spectrum with the sun at zenith (90 degrees elevation) shows minimum absorption and is referred to as an Air-Mass One Spectrum. At an elevation of 30 degrees (60 degrees from zenith), the path length is doubled and the solar spectrum is called Air-Mass Two.

Since atmospheric scattering and absorption constituents are continually changing, measurements of solar radiance on the earth's surface necessarily lack reproducibility and accuracy. Models have been developed that start with spectral distribution outside the atmosphere (Air-Mass Zero) and calculate the effects of scattering and absorption for assumed atmospheric conditions and sun angles. It is the spectral radiance of a family of Air-Mass distribution values that solar simulators are designed to simulate.

Ideally, the solar simulator would match the entire spectrum or the sun, both in spectral distribution and amplitude, but this rigorous requirement is not always necessary. Different applications make some portions of the spectrum more important than others. The rendition of colors is important mainly within the visible portion of the spectrum. Testing of dye and pigment fading, and of biological effects emphasizes the ultraviolet. Photographic standardization is in the visible and near-infrared, while simulators for solar heating require the addition of longer wavelength infrared energy. Space technological testing requires the full spectrum. In some cases, the power required is many times the solar constant, and in other cases, spatial uniformity and some degree of collimation are more important.

All simulators employ a light source, some collecting and projecting optics and (usually) filtering to provide the spectrum required. No light source exactly duplicates the spectral radiance of the sun as seen on the earth. Ninety Percent of the solar energy is distributed between 276 and 4960 nm. Over this region, the sun's spectrum is closely matched by the high-pressure xenon lamp, with the exception of the lamp's strong emission lines in the near-infrared and some excess ultraviolet. The minimal filtering required and the high efficiency of the xenon lamp mean that both the spectrum and total power of the sun can be achieved in nearly collimated beams over usably-sized areas for laboratory work.

The prior art device of FIG. 1 is typical of the existing or conventional solar simulators 10. The light source 12 is shown as three high intensity lamps 14 of the xenon type. Parabolic or elliptical light collectors 14 surround each of the lamps and direct the light form their respective lamps to a folding mirror 16. The light from each of the separate folding mirrors is directed to a common light collecting mirror 18. The combined light from the mirror 18 is directed through a field lens system 19 which reduces the lens exit diameter for focusing the reduced diameter light beam through an optical integrator lens 20 which provides an expanding light field or projection of the light entering the vacuum chamber. A parabolic output collimator 24 collimates the light and directs the collimated light on the test specimen 26. In this fashion the simulated sun light of the desired spectrum is directed to the specimen to test the effect thereon. For certain testing either the collimator, folding mirrors, field lens and/or vacuum may be eliminated.

The sun simulators as specifically discussed above and including other state of the art simulators are somewhat successful for the purpose intended, but have several features that need improvement. Generally speaking, the state of the art simulators are quite costly to fabricate due to the special lens requirements. They are both difficult to initially align so as to maintain even illumination and to fixedly secure the lens system in place and to maintain the lens system in position. The use of the required number of mirrors and lens produces an inefficient use of primary power, i.e. the best state of the art solar simulators are less than 5% efficient.

The present invention improves the many short comings of the state of the art sun simulators.

SUMMARY OF THE INVENTION

The solar simulator of the instant invention eliminates the need for mirrors for folding the light or for a lens system for reducing the diameter of the light passing into the vacuum chamber or an integrator for evening the output illumination over the spatial area illuminated by the simulator. The instant invention utilizes flexible fiber-optic and/or liquid-optic guides which eliminates their need. These improvements provide a solar simulator having an efficiency greater than 13%.

In the present invention the light from the light source is collected at the focal point of the parabolic light reflector which is of a diameter equal to or slightly less than the diameter of the distal end of the optic guide. The output of the optic guide is directed through an opening in the vacuum chamber equal is size to the optic guide. No projection lens is required as the light expands as it exits the end of the optic medium. The omission of the mirrors, lens and integrator or projection lens provides for an efficient light transfer and hence more efficient in light transfer when compared with the prior art. As in the prior art, a light collimating reflector is also used only as required.

An object of this invention is to reduce the primary power required for a given solar simulator system as compared with present state of the art systems.

Another object of this invention is to eliminate light source to test specimen mirror and lens alignment requirements and alignment maintenance.

Yet another object of this invention is to reduce the economic costs of construction of a sun simulator.

These and other objects and features of the invention will be more fully understood from the following description of the preferred embodiments taken together with the accompanying drawing.

BRIEF DESCRIPTION OF THE DRAWINGS

FIG. 1 is a schematic showing of a typical solar simulator of the prior art as described above;

FIG. 2 is a schematic showing of a first embodiment of the solar simulator of this invention;

FIG. 3 is a schematic showing of a second embodiment of the solar simulator of this invention;

DETAILED DESCRIPTION OF THE PREFERRED EMBODIMENTS

Figure 7:
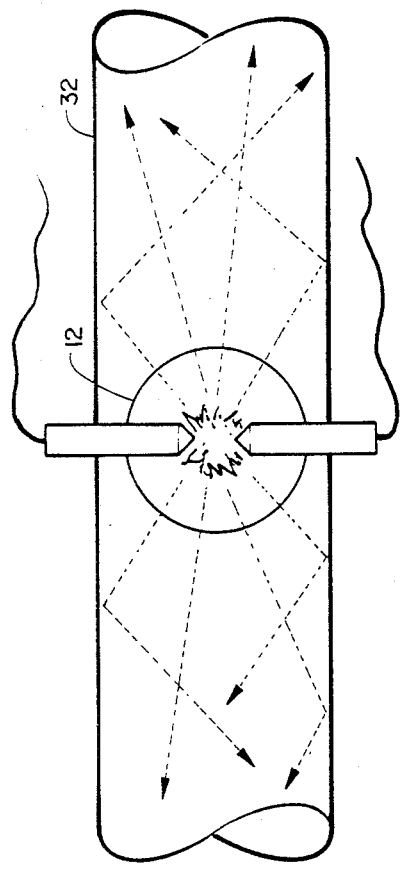
FIG. 7 is a detailed schematic showing of a fourth embodiment of the relative placement of a light source and a fiber optic guide.

Referring now specially to FIG. 2 which depicts a schematic showing of the solar simulator 28 of this invention. Similarly as shown in FIG. 1, three light sources are shown. It should be understood that the intensity level of these light sources is considerably less than the intensity of the light sources of those in FIG. 1. The parabolic light collectors 14 direct substantially all of their light energy into the end 30 of its adjacent flexible optic guide 32 in the form of a large fiber optic. To achieve high transmission efficiency, the fiber optic guides would be fabricated from fused silica cores with silica cladding, which results in a numerical aperture of about 0.2, corresponding to a solid cone with a half angle of about 20 degrees. The ends 33 of the optic fiber guides are joined at a junction 34 in a manner so that the light energy from each optic fiber guide 32 is combined when entering into fiber optic guide 36 (connections of this type are well known in the fiber optic art). The light guides 32 may be contiguous through their entire length up to exit aperture 38. These guides are then placed in close proximity at point 34 to minimize the number of ports required in the chamber. Fiber optic guide 36 passes through wall of the vacuum chamber 22 and has a pressure tight seal therewith. The distal end 38 of the fiber optic guide 36 is positioned adjacent to the output collimator 24. If the output collimator is not required then the distal end 38 of fiber optic guide 36 is positioned directly over the test specimen 26 in a manner to cover the specimen with the desired amount of illumination. The solar simulator of the present invention eliminates the requirement for the mirrors, field lens and integrator lens.

FIG. 3 depicts a solar simulator similar to the showing of FIG. 2 the only difference being that a larger intensity light source is employed which replaces the three light sources of FIG. 2. In this embodiment the end 33 of fiber optic guider 32 extends into the chamber 22 in the same manner as fiber optic guide 36 described above.

Figure 4:
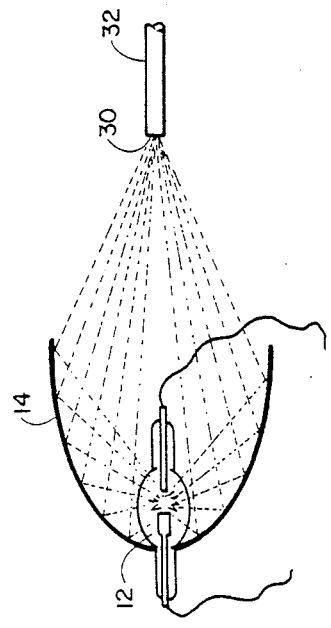
FIG. 4 is a detailed schematic showing of a light source of FIG. 2 relative to the position of a fiber optic guide.

FIG. 4 depicts a detailed schematic showing of a typical light source 12 and the parabolic housing 14.

Figure 5:
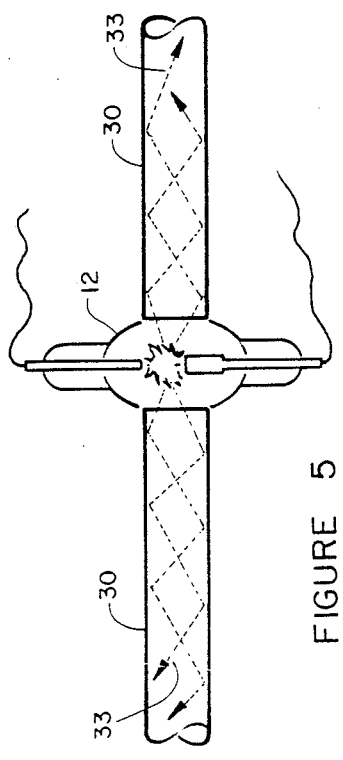
FIG. 5 is a detailed schematic showing of a second embodiment of the relative placement of a light source and a fiber optic guide.

FIG. 5 depicts a detailed schematic showing a light source inserted in series with a flexible optic guide. The fiber optic guide terminates in the same manner as described above to provide the light source at either end 33.

Figure 6:
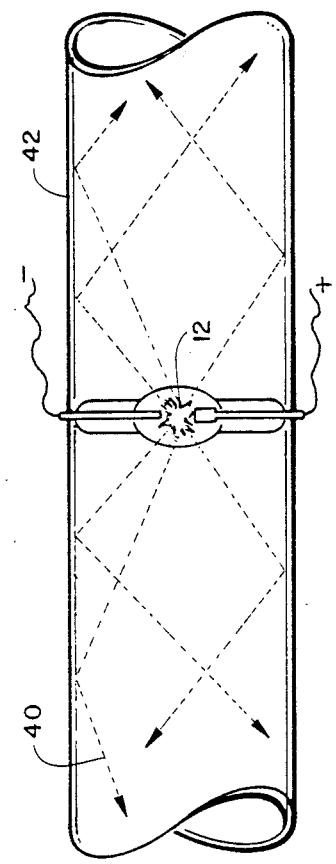
FIG. 6 is a detailed schematic showing of a third embodiment of the relative placement of a light source and a fiber optic guide.

FIG. 6 depicts a detailed schematic showing of a light source embedded in a confined optic liquid medium 40 such as but, not limited to, silicone fluid. The liquid medium which serves to act as the core of a flexible light guide is confined by any suitable tubular housing material 42 suitable for practicing the invention as intended. The housing should be clad with a layer having an index of refraction that is ideally less than that of the core fluid.

FIG. 7 is a showing similar to the showing of FIG. 6 with the light source embedded in a solid optic core such as a larger optic fiber.

Figure 9:
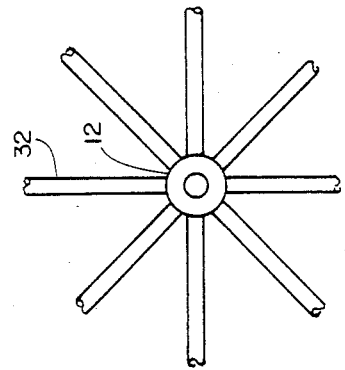
FIG. 9 is a detailed schematic showing of a single light source and the relative placement of a plurality of fiber optic guides.
Figure 8:
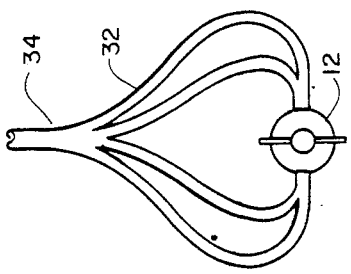
FIG. 8 is a detailed schematic showing of a fifth embodiment of the relative placement of a light source and a fiber optic guide.

FIGS. 8 and 9 are a schematic showing of multiple fiber optic guides connected to a single light source as shown in FIGS. 5 and 7 respectively.

While the invention has been described with reference to specific embodiments chosen for the purpose of illustration, it should be apparent that numerous modifications could be made thereto by those skilled in the art without departing from the basic concept and scope of the invention.

We claim:

1. An improved efficiency solar simulator system for substantially simulating the spectral radiance of the sun comprising:

a high intensity light source producing substantially the spectral radiance of the sun;

source optics for concentrating the high intensity light from the source into a narrow concentrated beam of light;

a vacuum chamber having confining walls positioned remote from said high intensity light source;

a test specimen positioned within said vacuum chamber;

an elongated flexible illumination guide means for guiding said narrow concentrated beam of light from said source optics through an opening in said confining wall of said vacuum chamber and forming a pressure tight seal with said opening, and means positioned within said vacuum chamber for expanding said narrow concentrated beam of light to illuminate said test specimen therewith.

2. The invention as defined in claim 1 wherein said high intensity light source is at least one high intensity xenon light.

3. The invention as defined in claim 1 wherein said high intensity light source comprises a plurality of xenon light sources.

4. The invention as defined in claim 1 wherein said source optics comprise at least one elliptical or parabolic reflector.

5. The invention as defined in claim 1 wherein said elongated flexible illumination guide has said high intensity light source positioned in series therewith intermediate it ends.

6. The invention as defined in claim 1 wherein said source optics comprises said elongated flexible illumination guide and said high intensity light source is embedded therein.

7. The invention as defined in claim 1 wherein said high intensity light source comprises a plurality of high intensity lights and said elongated flexible illumination guide comprising first input ends equal in number to said plurality of high intensity lights, a single output end and a transition means intermediate said first input ends and said single output end connecting said first input ends to said output end whereby the concentrated light from each of said first input ends being further concentrated into said single output end.

8. The invention as defined in claim 1 wherein said high intensity light source is a single high intensity light and said illumination guide means comprises a plurality of first input ends all of which concentrate high intensity light, a single output end and a transition means positioned is series therebetween whereby the concentrated light from each of said input ends being further concentrated into said single end.

9. The invention as defined in claim 1 wherein said elongated illumination guide means comprises fiber optics.

10. The invention as defined in claim 9 wherein said fiber optics are formed from fused silica cores with silica cadding and have a numerical aperture of about 0.2.

11. The invention as defined in claim 1 wherein said elongated illumination guide means comprises a rigid clad rod.

12. The invention as defined in claim 1 wherein said elongated illumination guide means comprises a liquid optics medium confined within a flexible tube.

13. The invention as defined in claim 12 wherein the core of said flexible light guide is a silicone fluid.

14. The invention as defined in claim 1 wherein said illumination guide means includes an output end and said improved efficiency solar simulator system additionally comprising a light collimator positioned adjacent to said output end of said illumination guide means for collimating the light therefrom prior to illuminating said test specimen.

15. The invention as defined in claim 1 wherein said improved efficiency solar simulator system additionally comprises a vacuum chamber having an enclosure wall which seals said chamber from the atmosphere for containing said test specimen and said elongated flexible illumination guide means extends into said vacuum chamber through said wall and has a sealed relationship therewith.

* * * * *